United States Patent
Hanson et al.

(10) Patent No.: US 9,129,287 B2
(45) Date of Patent: Sep. 8, 2015

(54) SYSTEM AND METHOD FOR GATHERING DATA FOR DETECTING FRAUDULENT TRANSACTIONS

(71) Applicant: Amazon Technologies, Inc., Reno, NV (US)

(72) Inventors: Robert Hanson, Seattle, WA (US); Gregory Look, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/046,585

(22) Filed: Oct. 4, 2013

(65) Prior Publication Data

US 2014/0143162 A1    May 22, 2014

Related U.S. Application Data

(63) Continuation of application No. 12/965,669, filed on Dec. 10, 2010, now Pat. No. 8,555,384.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06Q 30/00* | (2012.01) |
| *H04L 29/06* | (2006.01) |

(52) U.S. Cl.
CPC .......... *G06Q 30/018* (2013.01); *H04L 63/1408* (2013.01); *H04L 63/1433* (2013.01); *H04L 63/168* (2013.01)

(58) Field of Classification Search
CPC .............................. H04L 63/168; G06Q 30/00
USPC ........................................................... 726/22
See application file for complete search history.

(56) References Cited

U.S. PATENT DOCUMENTS

| | | |
|---|---|---|
| 7,269,833 B2 | 9/2007 | Kushnirskiy |
| 7,330,871 B2 | 2/2008 | Barber |
| 7,512,715 B2 | 3/2009 | Marks |
| 7,664,862 B2 | 2/2010 | Barton et al. |
| 7,853,533 B2 | 12/2010 | Eisen |
| 8,095,967 B2 | 1/2012 | Loesch et al. |
| 8,239,939 B2 | 8/2012 | Dunagan et al. |

(Continued)

OTHER PUBLICATIONS

Kenneth C. Wilbur; Click Fraud; Oct. 24, 2008; Marketing Science; vol. 28 Issue 2, Mar.-Apr. 2009, pp. 293-308.*

(Continued)

*Primary Examiner* — Monjour Rahim
(74) *Attorney, Agent, or Firm* — Knobbe, Martens, Olson & Bear LLP

(57) ABSTRACT

A system and method for gathering data for detecting fraudulent transactions includes, in one embodiment, a web page that contains a fraud data gathering script and causes a client device to download a fraud detection applet. The fraud data gathering script causes the client device to collect information from the client device that is usable to identify the client device. The fraud detection applet causes the client device to connect to an identification echo service server to obtain the actual IP address of the client device. The fraud detection data, including the identifying information and the actual IP address, are then sent to a web server and/or a fraud data gathering server for further processing and to determine whether a transaction with the client device is likely to be fraudulent.

22 Claims, 6 Drawing Sheets

(56) References Cited

U.S. PATENT DOCUMENTS

| | | |
|---|---|---|
| 8,307,099 B1 | 11/2012 | Khanna et al. |
| 2002/0035622 A1* | 3/2002 | Barber .......................... 709/220 |
| 2002/0186237 A1 | 12/2002 | Bradley |
| 2003/0097591 A1* | 5/2003 | Pham et al. .................. 713/201 |
| 2007/0094095 A1 | 4/2007 | Kilby |
| 2007/0255821 A1* | 11/2007 | Ge et al. ........................ 709/224 |
| 2008/0320125 A1* | 12/2008 | O'Sullivan et al. ........... 709/224 |
| 2010/0235915 A1* | 9/2010 | Memon et al. .................. 726/23 |
| 2011/0016528 A1* | 1/2011 | Zhou et al. ...................... 726/23 |
| 2011/0047620 A1* | 2/2011 | Mahaffey et al. ............... 726/23 |
| 2012/0030771 A1* | 2/2012 | Pierson et al. .................. 726/26 |
| 2012/0084146 A1* | 4/2012 | Zwicky ...................... 705/14.47 |
| 2013/0014020 A1* | 1/2013 | Dixon et al. .................. 715/738 |
| 2013/0080248 A1* | 3/2013 | Linden et al. .............. 705/14.47 |

OTHER PUBLICATIONS

Salvatore J. Stolfo; Cost-based Modeling for Fraud and Intrusion Detection: Results from the JAM Project; Columbia University; Date:2000; p. 1-16.*

Chan, Philip K. "Distributed data mining in Credit Card Fraud Detection", IEEE 2007, pp. 1-17.

\* cited by examiner

SYSTEM AND METHOD FOR GATHERING DATA FOR DETECTING FRAUDULENT TRANSACTIONS

INCORPORATION BY REFERENCE TO ANY PRIORITY APPLICATIONS

Any and all applications for which a foreign or domestic priority claim is made are identified in the Application Data Sheet filed with the present application and are incorporated by reference under 37 CFR 1.57 and made a part of this specification.

BACKGROUND

The increasing success of the Internet as a platform for electronic commerce is indisputable. Countless items, both tangible (such as household items, electronic devices, and the like) and intangible (such as digital copies of songs, movies, software applications, and the like) are bought and sold through Internet-based merchants every day. The ever-increasing ease of access to the Internet for even unsophisticated users, as well as the ever-increasing number of options for billing customers for Internet-based transactions, have helped fuel the proliferation of Internet-based commerce.

Unfortunately, the growing amount of Internet-based commerce has led to a growing amount of fraud in Internet-based transactions. Whether through the use of stolen personal information of legitimate users, or through the exploitation of security flaws in various Internet commerce platforms, detecting potentially fraudulent transactions has become a serious issue that must be addressed by Internet-based merchants. While no system is likely to prevent or detect all fraudulent transactions, what is needed is a way to collect additional data that can help identify which transactions are potentially fraudulent so that such transactions can be carefully monitored or reviewed before fulfillment, or so that future transactions with the same party can be avoided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

One technique to help stop fraudulent transactions is the collection of fraud detection data. In this technique, data characterizing a new client device is collected by a server managing a transaction. This data is compared to stored data characterizing client devices associated with previous transactions known to be fraudulent. If the data characterizing the new client device is similar enough to previous client devices known to be associated with fraudulent transactions, transactions from the new client device will be marked as potentially fraudulent. This can cause the transactions to be blocked, or to be flagged for further review for fraud before fulfillment. One piece of information that is effective in characterizing a client device is a network address used by the client device, such as an Internet Protocol (IP) address. However, some client devices may appear to the server to be associated with an IP address other than an actual IP address of the client device. For example, if a client device connects to the server via a proxy server, the server may detect the IP address of the proxy server instead of the IP address of the client device.

In one embodiment of the present disclosure, an identification echo service (IDES) server is provided. A web server instructs a client device to execute code that contacts the IDES server over a port other than a port commonly used for proxy communication. The IDES server receives the connection from the client device, and sends information to the client device that the IDES server detects from the client device to identify the client device. For example, the IDES server may send the detected IP address of the client device back to the client device, in an obfuscated or encrypted format. The client device combines the information from the IDES server with other metadata values for identifying the client to create a metadata string. The metadata string is transmitted to the web server, which transmits the metadata string to a fraud data gathering server to be compared to previously received metadata strings in order to detect client devices previously associated with fraudulent activity.

Figure 1:
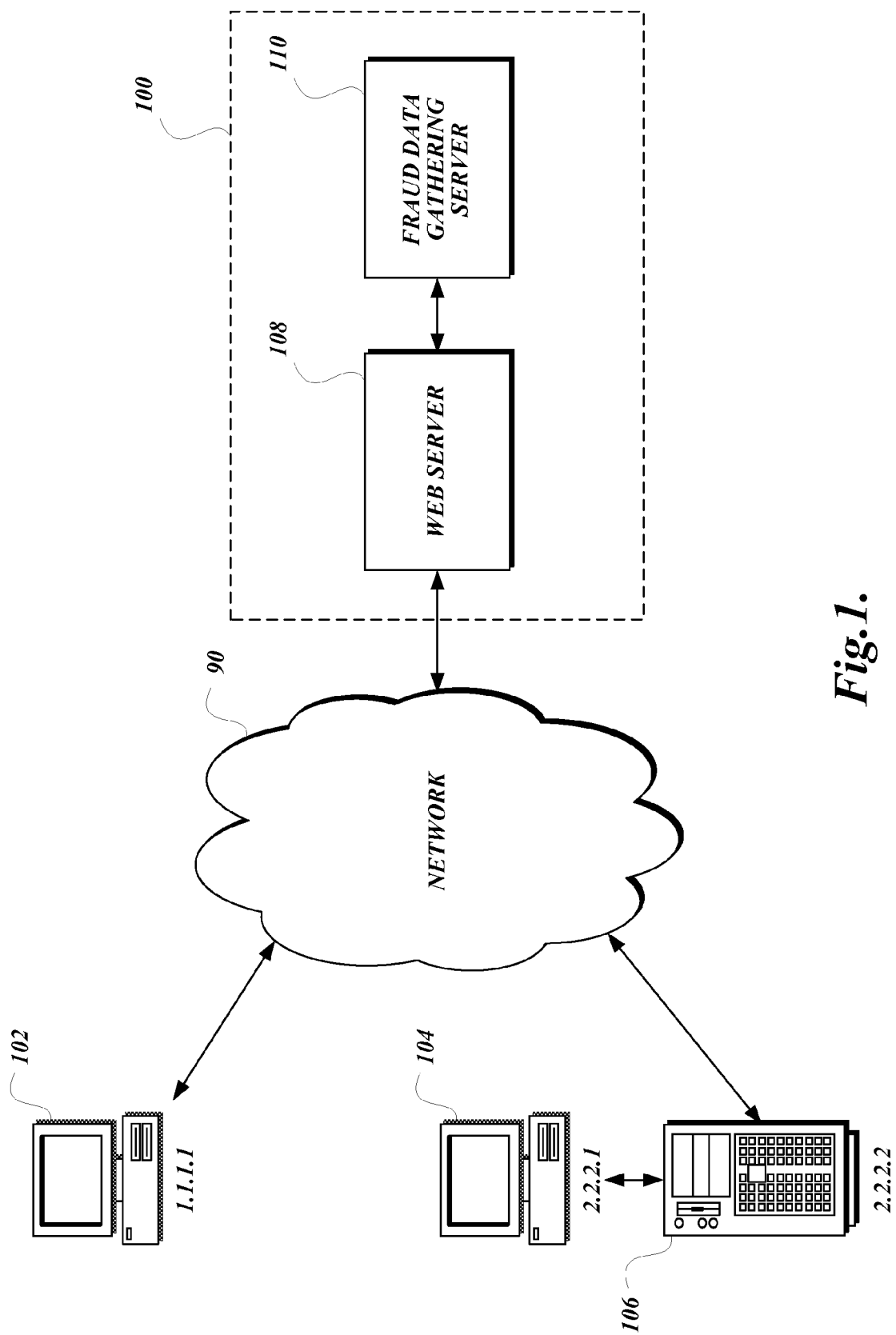
FIG. 1 is a block diagram illustrating one embodiment of a system for gathering fraud detection data.

FIG. 1 is a block diagram illustrating one embodiment of a system 100 for gathering fraud detection data. A first requesting client device 102 is communicatively coupled to a web server 108 via a network 90, such as the Internet. A second requesting client device 104 is communicatively coupled to a client proxy device 106, which is in turn communicatively coupled to the web server 108 via the network 90. The connection between the second requesting client device 104 and the client proxy device 106 may also be via the network 90, or may be via another network that is not illustrated in FIG. 1. The web server 108 is communicatively coupled to a fraud data gathering server 110, either directly or via a network not illustrated.

In one embodiment, each of the first requesting client device 102, the second requesting client device 104, the client proxy device 106, the web server 108, and the fraud data gathering server 110, along with every other computing device discussed herein, may include one or more physical computing devices. One example of a physical computing device is a computer having a memory and a processor, such as a desktop computer. Other examples of physical computing devices include server computers, distributed computers, cell phones, laptops, PDAs, smart phones, tablet computing devices, netbooks, electronic book readers, and the like. Computing devices may also include one or more computer-readable media, including physical devices such as hard disk drives, floppy disk drives, RAM, ROM, flash memory, CD-ROM drives, DVD-ROM drives, BLU-RAY DISC® drives, and the like.

The first requesting client device 102 may have an address that identifies the device in a network. In the illustrated embodiment, the first requesting client device 102 has an Internet Protocol (IP) address of 1.1.1.1. As understood by one of ordinary skill in the art, an IP address is a network address that is used to route TCP/IP data packets to and from a device connected to the network (such as the Internet). An IP address is commonly represented by four numbers, each in a range from 1 to 255. The first requesting client device 102 is configured to communicate with a web server 108, for example, to submit a login request to the web server 108. The login request is submitted via the network 90. In this system 100, the web server 108 is configured to collect information that can be used to help identify the client device 102 from which the request was received, and to transmit that information to the fraud data gathering server 110 for processing or storage. As discussed further below, this information can include the network address of the first requesting client device 102.

In the embodiment illustrated in FIG. 1, the second requesting client device 104 has an IP address of 2.2.2.1. However, a user of the second requesting client device 104 might try to hide the true IP address of the client device 104. The user may be motivated to do so if, for example, the second requesting client device 104 had previously been associated with fraudulent behavior. The user of the second requesting client device 104 can configure the device to communicate with the web server 108 via the client proxy device 106. As illustrated, the client proxy device 106 has an IP address of 2.2.2.2. The client proxy device 106 is configured to connect to the web server 108 and relay communication between the web server 108 and the second requesting client device 104. The web server 108 will detect the IP address of the client proxy device 106 and consider the client proxy device 106 as the source of the communication, instead of the second requesting client device 104. As a result, the web server 108 will transmit the IP address of the client proxy device 104 to the fraud data gathering server 110 for processing or storage. Without implementing additional features as described herein (see FIGS. 2-6), the web server 108 will not know that the true originator of the communication is the second requesting client device 104. This may allow the second requesting client device 104 to conduct a fraudulent transaction without advance detection.

Figure 2:
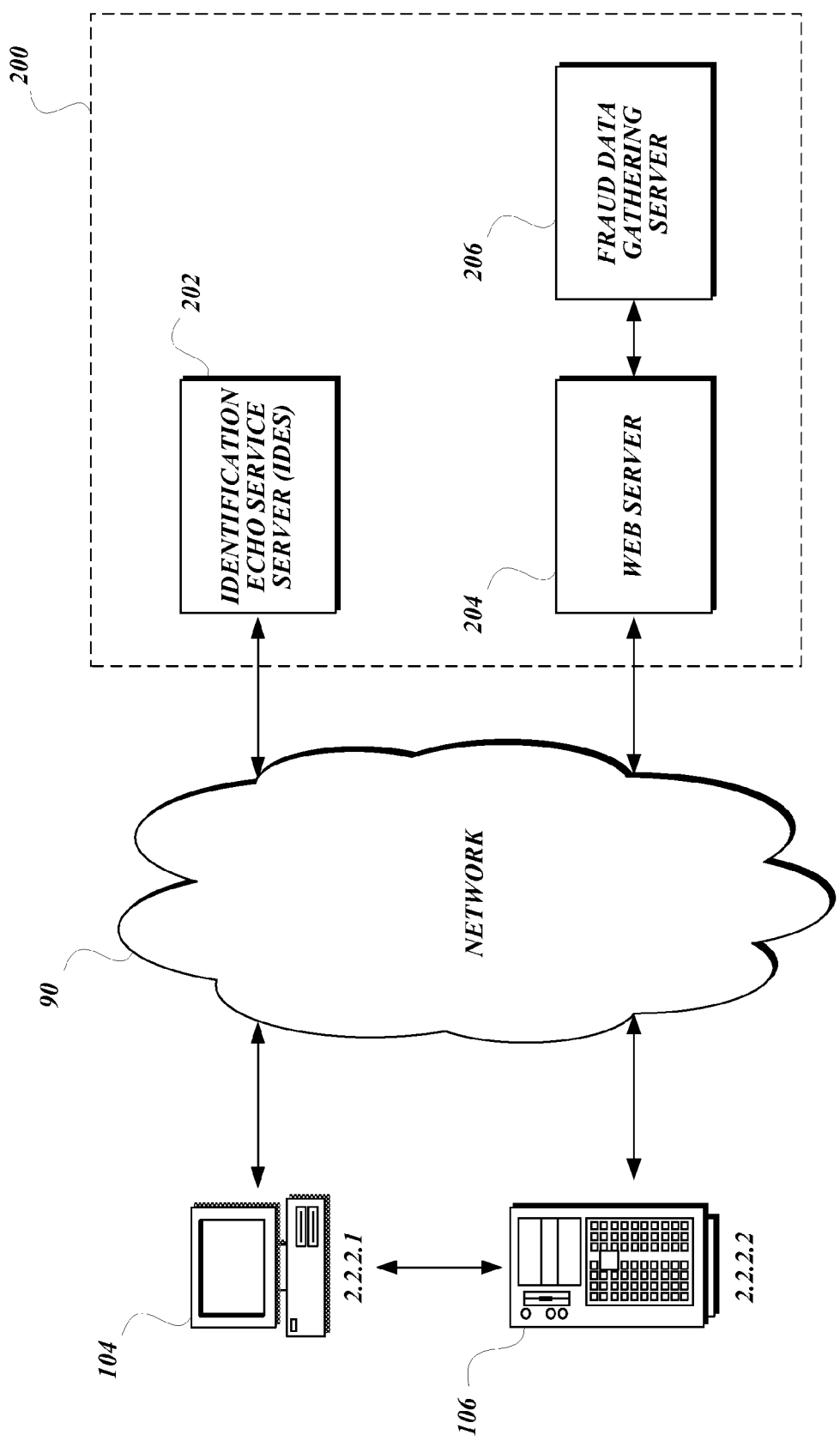
FIG. 2 is a block diagram illustrating one embodiment of a fraud detection data gathering system according to various aspects of the present disclosure.
Figure 3:
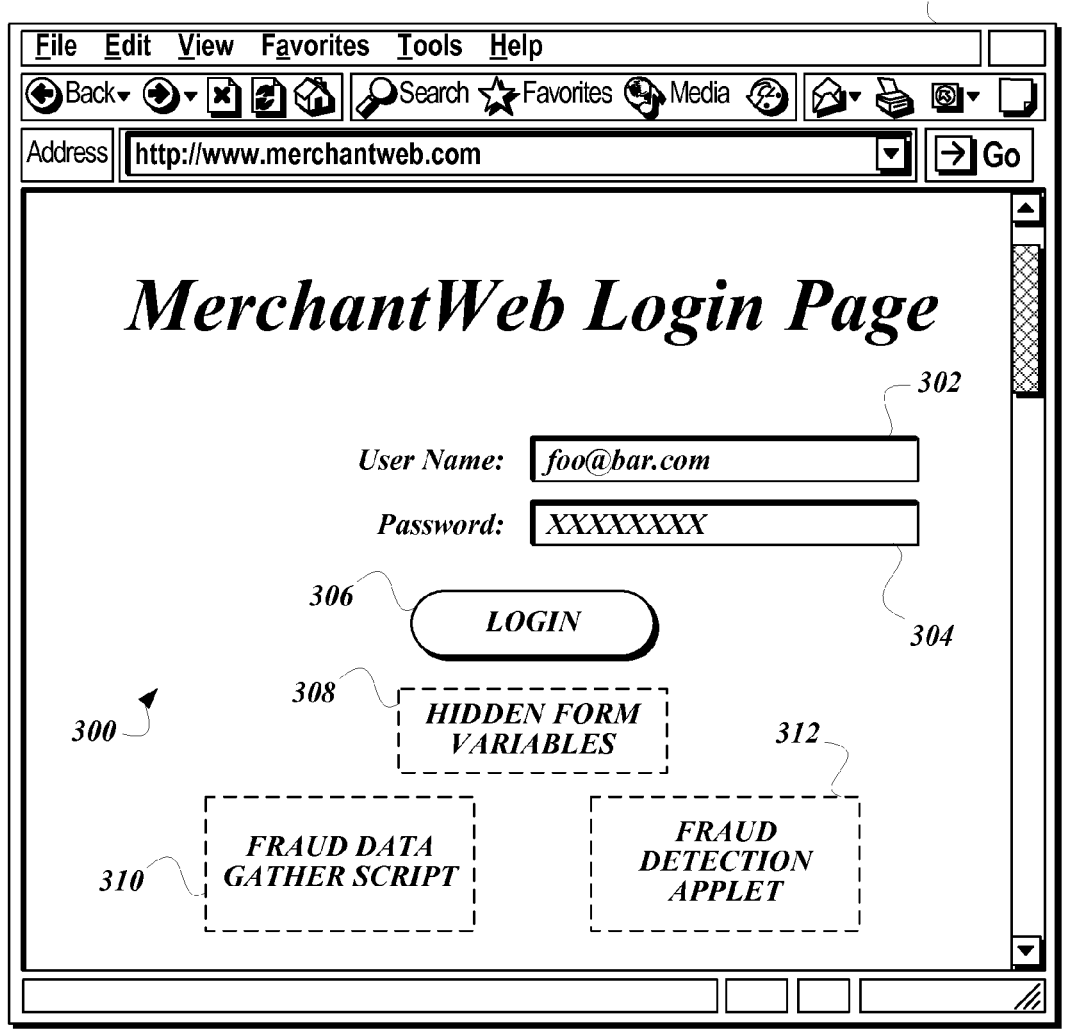
FIG. 3 illustrates one embodiment of a login web page 300 configured to determine a client device's actual IP address according to various aspects of the present disclosure.

FIG. 2 is a block diagram illustrating another embodiment of a fraud detection data gathering system 200 according to various aspects of the present disclosure. A client device, such as a second requesting client device 104 as described above with regard to FIG. 1, has a communication connection with a client proxy device 106, as also discussed above. A web server 204 of the fraud detection data gathering system 200 is configured to respond to requests received from client devices via a network 90, which may be, for example, the Internet. The second requesting client device 104 is configured as discussed above, and, in this example, requests a login web page 300 (as illustrated in FIG. 3) from the web server 204 via the client proxy device 106. The web browser of the second requesting client device 104 is configured to forward all requests for web content to the client proxy device 106, which then communicates with the web server 204. This may be done to hide the actual IP address of the second requesting client device 104 from the web server 204.

As is understood by one of ordinary skill in the art, TCP/IP communication can be performed over various "ports." As is also understood by one of ordinary skill in the art, web page transmission is commonly associated with port 80 or port 443. A user may have configured the web browser on the second requesting client device 104 to forward requests to the client proxy device 106, or alternatively may have configured all traffic sent to port 80 or port 443 on the second requesting client device 104 to be forwarded to the client proxy device 106.

In the embodiment shown in FIG. 2, the fraud detection data gathering system 200 includes an identification echo service (IDES) server 202. When the second requesting client device 104 receives the login web page 300 from the web server 204, the web page includes a reference that causes the web browser 92 to obtain and execute the fraud detection applet 312. In one embodiment, the fraud detection applet 312 may be downloaded from the web server 204. In another embodiment, the fraud detection applet 312 may be downloaded from another server that is a part of the fraud detection data gathering system 200, such as a media server (not shown). In yet another embodiment, the fraud detection applet 312 may already reside on the client device 104, such as in a case where the client device 104 obtained the fraud detection applet 312 during a previous transaction, or when the fraud detection applet 312 was provided as part of an application installed on the client device 104.

The fraud detection applet 312, once obtained by the client device 104, is configured to communicate with the IDES server 202. In one embodiment, the applet 312 communicates with the IDES server 202 on a port other than port 80, port 443, or other ports that are likely to be automatically forwarded to the client proxy device 106. In one embodiment, the applet 312 communicates with the IDES server 202 over port 843, but it is understood that this port instance is exemplary only and is not intended to limit the scope of the technology described herein. As further discussed below, the fraud detection applet 312 executes within an applet execution framework operating on the client device 104 and bypasses the proxy settings of the web browser 92. Further, since, in one instance, the fraud detection applet 312 communicates with the IDES server 202 on a port other than port 80 or port 443, any configuration of the client device 104 that forwards all traffic over port 80 or port 443 to the client proxy device 106 is also bypassed.

By virtue of the connection established by the applet 312 with the IDES server 202, the IDES server 202 is able to obtain the true network address of the client device 104 and to provide the true network address to the fraud detection applet 312 as will be further described below with regard to FIGS. 5 and 6. The fraud detection applet 312 includes the true network address of the client device 104 in the hidden form variables 308 for submission to the web server 204. The web server 204, or some other component of the system 200, evaluates the submission for any inconsistencies suggesting a possible fraudulent transaction and/or compares the submission to the information stored in the fraud data gathering server 206.

FIG. 3 illustrates one embodiment of a login web page 300 used in the system 200 illustrated in FIG. 2. The login web page 300 is illustrated as being rendered by a standard web browser 92, such as the INTERNET EXPLORER® browser distributed by Microsoft, the FIREFOX® browser distributed by the Mozilla Foundation, the Chrome browser distributed by Google, and the like. The login web page 300 includes visible form elements, including a user name input field 302, a password input field 304, and a login button 306. The login web page 300 also includes elements that are used by the web browser 92 but are not visibly rendered. For example, the login web page 300 includes hidden form variables 308 and a fraud data gather script 310.

In one embodiment, upon rendering the login web page 300, the web browser 92 executes the fraud data gather script 310. The fraud data gather script 310 collects information made available by the web browser 92, and stores the information in one or more of the hidden form variables 308. When the user actuates the login button 306, the web browser 92 submits the form data to the web server 204, including the data from the visible form elements 302, 304, and from the hidden form variables 308.

In one embodiment, the login web page 300 further includes a reference to executable code, which can be in the form of a fraud detection applet 312. In this embodiment, the fraud data gather script 310 is adapted to use data obtained by the fraud detection applet 312. In one embodiment, the fraud detection applet 312 is downloaded by the web browser 92, and runs within an applet execution framework (not shown) on the client device.

In one embodiment, the applet execution framework used is the FLASH® Player currently distributed by Adobe Systems, Inc. In this embodiment, the fraud detection applet 312 is a FLASH® application, which relies on features contained in the FLASH® Player for functionality. In other embodiments, other applet execution frameworks and applet technologies can be used, such as SILVERLIGHT® (distributed by Microsoft), JAVA® (developed by Sun Microsystems and distributed by Oracle), and the like. In yet other embodiments, an applet execution framework may not be required for the executable code of the applet 312 to function. As understood by one of ordinary skill in the art, in one embodiment, the applet can be any executable code or portion thereof configured to implement the functions of the applet 312 described herein, including executable code that is part of a larger application installed on a client device. The term "applet" is not limited to a specific form of executable code or any particular technology such as FLASH®, JAVA®, and the like.

Figure 4A:
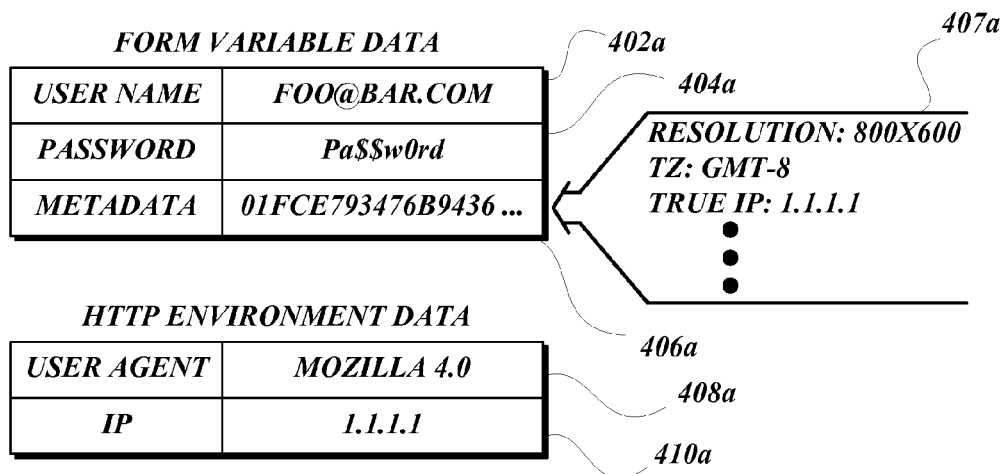
FIGS. 4A-4C illustrate examples of data collected by the system illustrated in FIG. 2 in various scenarios.
Figure 4B:
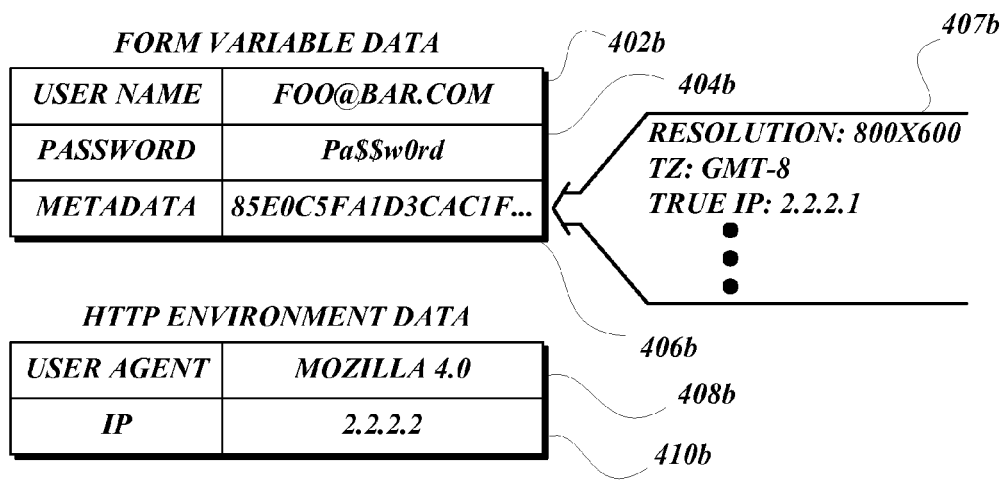
Figure 4C:
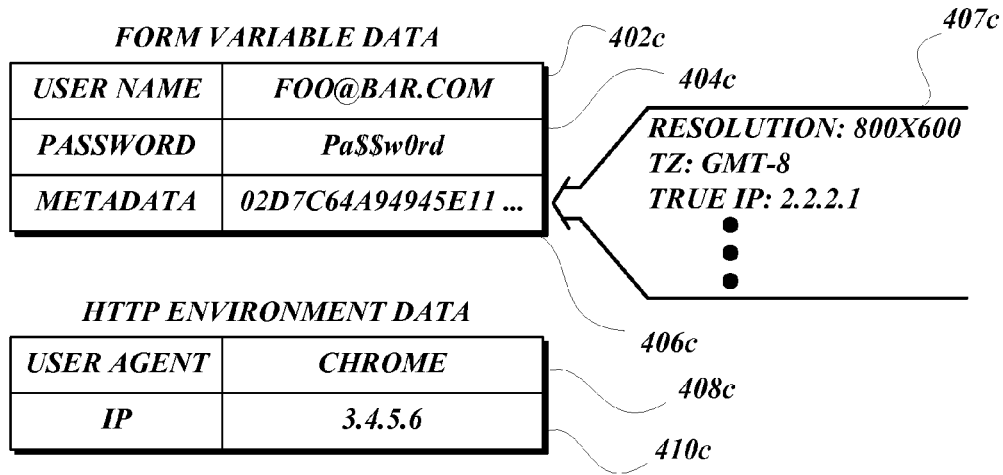

FIGS. 4A-4C illustrate examples of data collected by the system 200 in various scenarios. Two types of information are obtained by the web server 204: form variable data and HTTP environment data. The types of information submitted in the form variable data are defined by the structure of the form in the web page 300, including the hidden form variables 308 and any other variables added by the fraud data gather script 310. The types of information contained in the HTTP environment data are defined by the web server 204 regardless of the instructions of the web page 300, and are collected by the web server 204 as part of establishing a communication connection with a client device and receiving a request for web content. The particular types of form variable data and HTTP environment data described herein are merely illustrative and are not intended to limit the scope of the present disclosure.

More specifically, FIG. 4A illustrates an example of data collected when a device such as the first requesting client device 102 submits a login request directly to the system 200. The form variable data includes a user name value 402a and a password value 404a as entered by the user into the user name input field 202 and the password input field 204, respectively, of the web page 200. The form variable data also includes a metadata string value 306a. The metadata string value 306a is a value that represents information gathered by the fraud data gather script 210 that the system 200 may use to create a "fingerprint" for the first requesting client device 102. This information is taken from data provided by the web browser 92, and may be sent to the web server 204 along with a login request. More detail concerning the generation of a "fingerprint" for a requesting client device can be found in co-pending, co-owned U.S. patent application Ser. No. 11/613,007, entitled "IDENTIFYING USE OF SOFTWARE APPLICATIONS," which is incorporated herein by reference in its entirety for all purposes.

In the illustrated example, the depicted metadata string value 406a is a portion of an obfuscated string. The metadata string value 406a is based on one or more metadata component values 407a that include information useful for identifying the client device, such as a display resolution, a time zone setting, and the like. The metadata component values 407a also include a true IP address, a value obtained via the IDES server as will be described in more detail below. The metadata component values 407a were combined into a single string, which was then obfuscated to form the metadata string value 406a for transmission to the web server 204. In one embodiment, the combined single string is obfuscated through reversible encryption, so that the fraud data gathering system 200 may extract the metadata component values 407a after receiving the metadata string value 406a. In other embodiments, the metadata string value 406a may be submitted without such encryption, may be obfuscated via a reversible hash function, and the like.

The HTTP environment data includes values that are typically automatically gathered by the web server 204 regardless of the content of the web page 300 or the fraud data gather script 310. One example of HTTP environment data gathered by the web server 204 is a user agent value 408a. The user agent value 408a is a string transmitted by the web browser 92 that identifies versions and capabilities of the web browser 92. This value allows the web server 204 to tailor the web page to be sent to the client device to the particular capabilities of the identified web browser. The illustrated user agent value 408a has been truncated for clarity, but one of ordinary skill in the art would recognize that a user agent value 408a can also include information such as the name and version of the web browser, the name and version of the operating system executing on the client device, installed versions of particular add-on software such as the .NET Framework, and the like.

Another example of HTTP environment data collected by the web server 204 is an IP address value 410a. The IP address value 410a may not be submitted by the web browser 92, but instead may be detected by the web server 204 directly from the TCP/IP connection with the client device. The IP address value 410a is often provided to programs running as part of the web server 204 as an HTTP environment variable, such as through the "REMOTE_ADDR" environment variable in an Apache web server.

One of ordinary skill in the art will recognize that these examples of form variable data and HTTP environment data are not exhaustive. A web server 204 used in embodiments of the present disclosure may receive more types or less types of form variable data, and may collect more types or less types of HTTP environment data or other data indicative of a communication between devices.

As stated above, FIG. 4A illustrates exemplary data collected during a connection from the first requesting client device 102 that is not attempting to circumvent the fraud data collection technique implemented by the script 310 illustrated in FIG. 3. The IP address value 410a reflects the actual IP address (1.1.1.1) of the first requesting client device 102, and matches the true IP address (1.1.1.1) metadata value. In a traditional fraud detection scheme, each of these values would be compared to values previously stored in the fraud data gathering server 206 to determine if the first requesting client device 102 has previously been associated with fraudulent transactions. If the client device 102 was previously associated with a fraudulent transaction, further transactions with the client device 102 may be voided, or at least be subject to higher scrutiny than other transactions.

FIG. 4B illustrates exemplary data collected during a connection from the second requesting client device 104 that passes through the client proxy device 106. The user name value 402b and password value 404b again reflect what was entered into the user name input field 302 and the password input field 304, respectively, at the client device 104. The true IP address metadata value obtained via the IDES server is the actual IP address (2.2.2.1) of the second requesting client device 104. Since the second client device 104 is connecting with the web server 204 via the client proxy device 106, the IP address value 410b reflects the IP address (2.2.2.2) of the client proxy device 106, instead of the IP address (2.2.2.1) of the second requesting client device 104. Even if the IP address of the second requesting client device 104 has previously been associated with fraudulent transactions, connecting through the client proxy device 106 to change the detected IP address value 410b may be sufficient to avoid detection as a possibly fraudulent connection if the IP address value 410b is the only value considered. However, by transmitting the true IP address within the metadata string value 406b, the likelihood of avoiding detection may be minimized. For example, since the true IP address is available, the true IP address may be compared against IP addresses previously associated with fraudulent transactions. As another example, the mere fact that the true IP address does not match the IP address value 410b may be used as evidence that a transaction is potentially fraudulent, or may suggest that further investigation or monitoring for other suspicious activity or behavior may be warranted.

FIG. 4C illustrates a connection from a client device such as the first requesting client device 102, when a user of the first requesting client device 102 is attempting to circumvent the fraud data gathering technique of the web server 204. The user name value 302c and password value 304c are the same as illustrated in FIG. 4A. However, in this case, a user has altered the user agent value 408c reported by the web browser 92 to disguise the identity of the web browser 92. In addition, the user has provided a fake IP address using one of a number of known techniques such as "IP address spoofing," thus causing the IP address value 410c to contain something other than the actual IP address (1.1.1.1) assigned to the first requesting client device 102. As with FIG. 4B, these changes may be sufficient to cause a possibly fraudulent transaction to be ignored as possibly fraudulent, if it were not for the inclusion of the true IP address within the metadata string value 406c.

Figure 5:
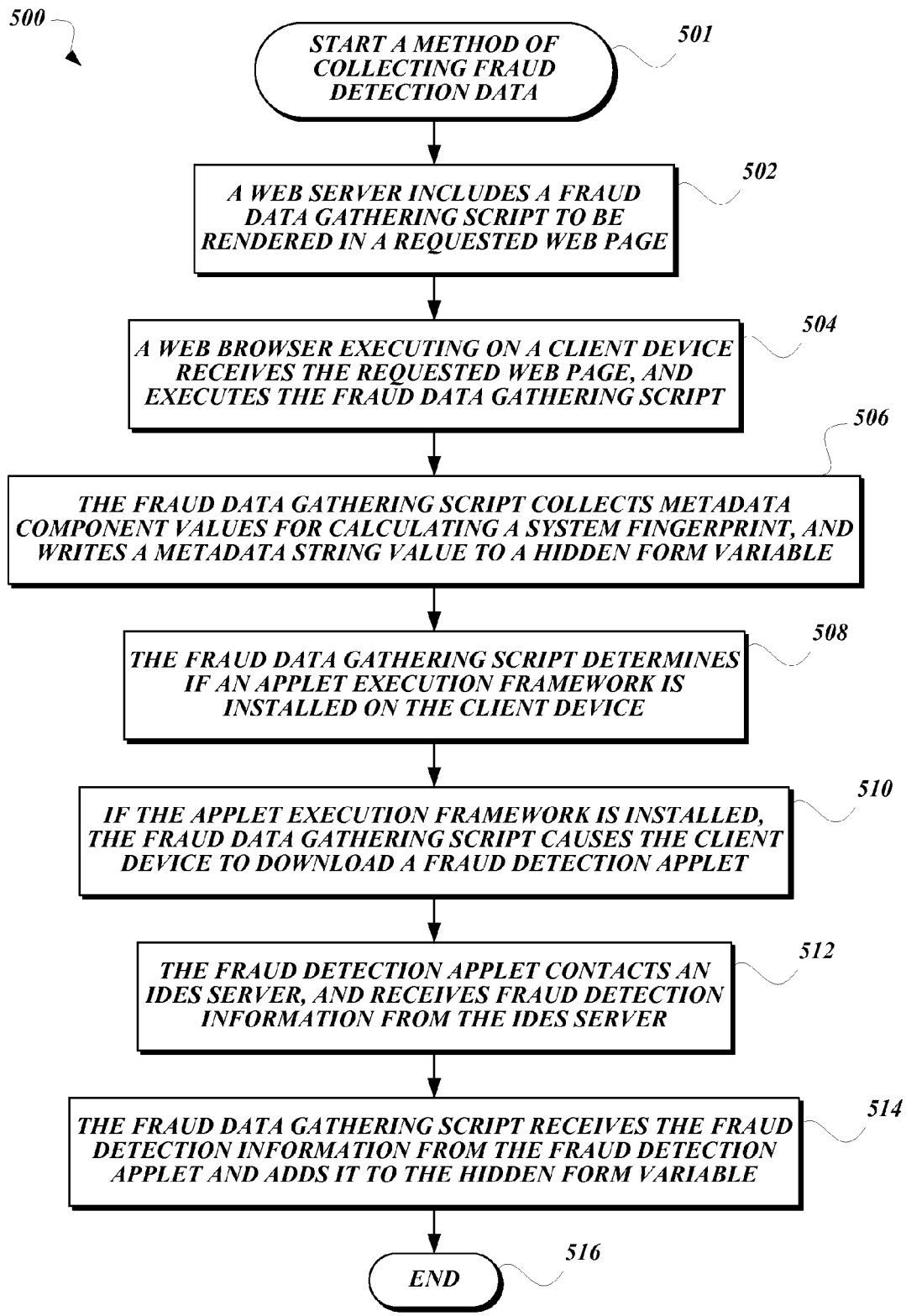
FIG. 5 is a flowchart illustrating one embodiment of a method of collecting fraud detection data according to various aspects of the present disclosure.

FIG. 5 illustrates one embodiment of a method 500 of collecting fraud detection data according to various aspects of the present disclosure. From a start block 501, the method 500 proceeds to block 502, where a web server 204 responds to a request for a web page received from a client device 102 and includes a fraud data gathering script 310 to be executed in a requested web page 300. Next, at block 504, a web browser 92 executing on the client device 102 receives the requested web page 300 from the web server 204 and executes the fraud data gathering script 310. The method 500 then proceeds to block 506, where the fraud data gathering script 310 collects metadata component values for calculating a system fingerprint, for example as described in co-pending U.S. application Ser. No. 11/613,007, and writes a metadata string value to a hidden form variable 308.

Next, at block 508, the fraud data gathering script 310 determines if an applet execution framework is installed on the client device 102. The method 500 then proceeds to block 510, where, if the applet execution framework is installed, the fraud data gathering script 310 causes the client device 102 to download a fraud detection applet 312. Next, at block 512, the fraud detection applet 312 is executed by the client device 102, which causes the client device 102 to establish a connection (e.g., a TCP/IP connection) with an identification echo service (IDES) server 202 and contact the IDES server 202. In response to this contact, the applet 312 receives fraud detection information from the IDES server 202.

In one embodiment, the fraud detection information received from the IDES server 202 includes the true IP address of the client device 102 as obtained by the IDES server 202. In one embodiment, the IDES server 202 obtains the true IP address by detecting a source IP address of the TCP/IP connection between the client device 102 and the IDES server 202. As discussed above, this true IP address of the client device 102 can be compared to other data to help detect potentially fraudulent transactions. In other embodiments, the fraud detection information includes the true IP address of the client device 102 along with other information to help make it more difficult to circumvent the fraud detection processes provided by the fraud detection data gathering system 200. For example, the fraud detection information can include a code based on the true IP address which is difficult for devices other than the IDES server 202 and the fraud data gathering server 206 to compute. This would make it more difficult for a malicious client to submit fabricated information to the web server 204 for the true IP address value. As another example, the IDES server 202 could use the connection with the client device 102 to collect TCP/IP stack fingerprinting data via a technique known to one of ordinary skill in the art, thereby obtaining further information about the configuration of the client device 102, such as software installed on the client device 102. This TCP/IP stack fingerprint can also be sent back to the applet 312 along with the actual IP address. In another embodiment, the IDES server 202 obfuscates the fraud detection information before transmission to the client device 102, for example, by reversibly encrypting the fraud detection information. The sequence of communication between the various components of the system 200 is further discussed below with respect to FIG. 6.

The method 500 then proceeds to block 514, where the fraud data gathering script 310 receives the fraud detection information obtained by the fraud detection applet 312 and adds the fraud detection information to the hidden form variables 308. In this example, the hidden form variables 308 are transmitted to the web server 204 when the user attempts to log in, as previously discussed. The method 500 then proceeds to an end block 516 and terminates.

Figure 6:
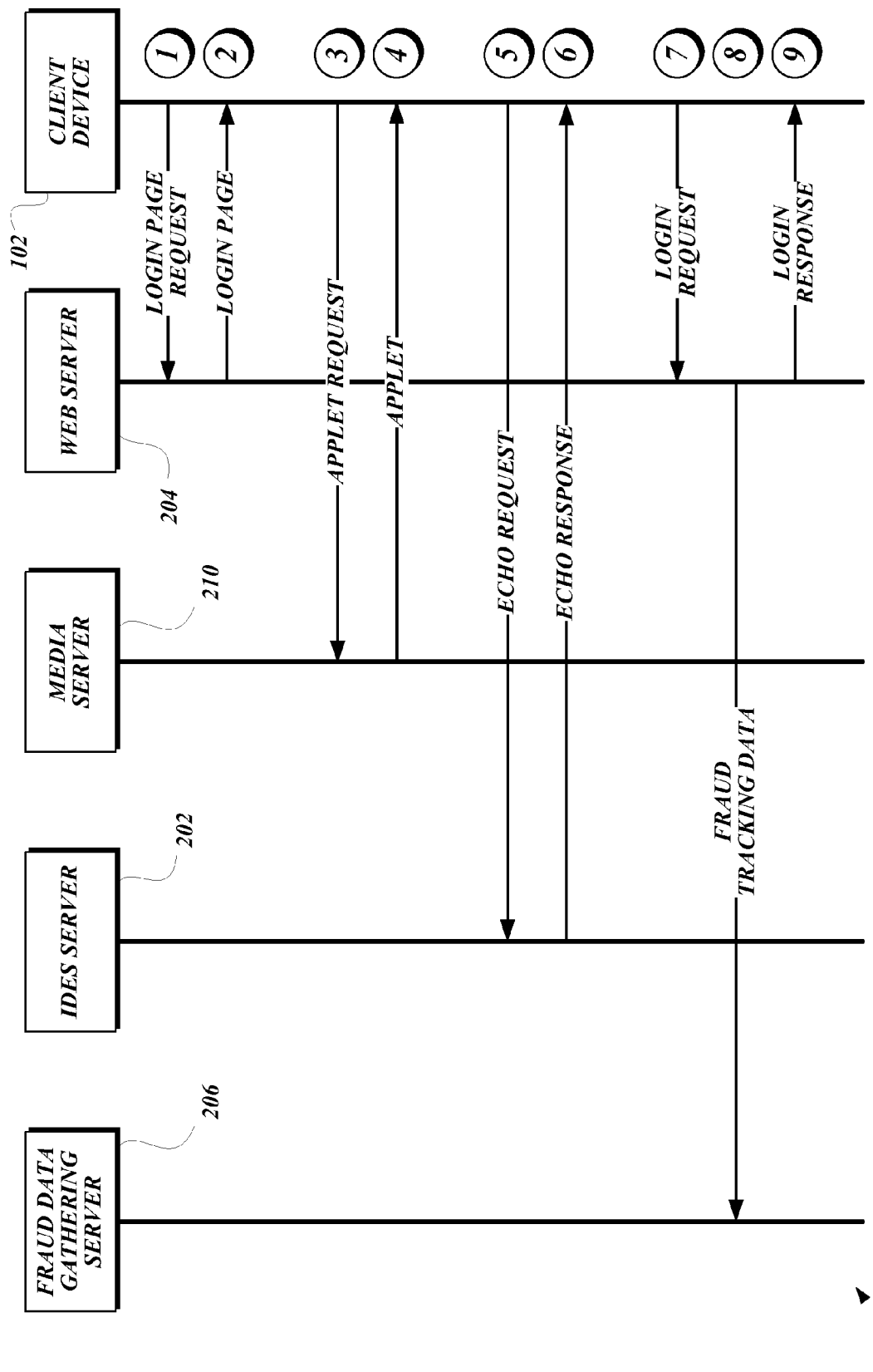
FIG. 6 is a sequence diagram showing communication between components of one embodiment of the system according to various aspects of the present disclosure.

FIG. 6 illustrates a sequence diagram 600 showing communication between components of one embodiment of the system 200 according to various aspects of the present disclosure. At step 1, the client device 102 transmits a login page request to the web server 204. At step 2, the web server 204 transmits the login page to the client device 102. The login page includes a fraud data gather script 310 as previously described. In another embodiment, the login page may include a reference to the fraud data gather script 310, which is then retrieved by the client device 102 from the web server 204 or a media server 210. The media server 210 is not illustrated in FIG. 2 for the sake of clarity but may be communicatively connected to the client device 102 via the network 90. The media server 210 may be a part of the system 200 and may be configured to provide bandwidth-intensive content, such as images, video, audio, client-executable files, and the like, to requesting client devices.

At this point, the web browser 92 executing on the client device 102 interprets and renders the content of the login page for display to a user of the client device 102. This rendering includes executing any scripts included with the login page, such as the fraud data gather script 310. The rendering also includes downloading any resources (such as images, applets, markup code, data, and the like) referenced by the login page.

In the illustrated embodiment, the login page includes an instruction to obtain and execute a fraud detection applet 312. Hence, in step 3, the client device 102 transmits a request for the applet 312. The applet request may be transmitted to the web server 204, or alternatively, as illustrated in FIG. 6, the applet request may be transmitted to the media server 210. In step 4, the media server 210 transmits the fraud detection applet 312 to the client device 102.

Next, the fraud detection applet 312 communicates with the IDES server 202 to retrieve the true IP address of the client device 102. In step 5, the fraud detection applet 312 on the client device 102 transmits an echo request to the IDES server 202. The IDES server 202 examines the addressing information associated with the connection between the IDES server 202 and the client device 102, and extracts from that addressing information the true IP address of the client device 102. In step 6, the IDES server 202 responds to the echo request by sending an echo response back to the client device 102. The echo response includes the true IP address as determined by the IDES server 202 from the addressing information. In one embodiment, since the IDES server 202 returns the true IP address by default, the echo request may be empty, or may contain only a default string or token such as "<echo_request/>." In other embodiments, the echo request may contain flags or other indicators of content that the fraud detection applet 312 wishes to receive from the IDES server 202.

In one embodiment, the fraud data gather script 310 on the client device 102 detects that the true IP address has been obtained by the fraud detection applet 312, and adds the true IP address data to the hidden form variables 308. In another embodiment in which the fraud detection applet 312 has permission to directly affect the document structure of the login web page 300, the fraud detection applet 312 itself adds the true IP address data to the hidden form variables 308.

Next, at step 7, the client device 102 transmits a login request to the web server 204. The login request is transmitted, for example, when the user actuates the login button 306 and causes the form data of the login web page 300, including the hidden form variables 308, to be transmitted to the web server 204. The web server 204 extracts the gathered fraud detection data from the login request, and, at step 8, transmits the gathered fraud detection data to the fraud data gathering server 206 for further processing. The further processing can include checking the data against previously received data for matches, or can simply include storing the data for later analysis. At step 9, the web server 204 transmits a login response to the client device 102.

As stated above, in one embodiment, the fraud detection applet 312 is a Flash application. This embodiment can have advantages due to the ubiquity of Flash installations amongst potential client devices. Not only is Flash likely to be installed on any given client device, but also since Flash by default communicates over at least port 843 in order to connect to network devices, communication from a given client device over port 843 to the IDES server 202 is likely to successfully pass through any packet filters or firewalls between the client device and the IDES server 202.

That said, in other embodiments, other application platforms can be used to implement the fraud detection applet 312. For example, the fraud detection applet 312 can be a JAVA® application, a SILVERLIGHT® application, an ACTIVEX® control, and the like.

In one embodiment, steps 3 through 6 of FIG. 6 are optional in the context of the overall login process. In such an embodiment, the login process may be allowed to continue in a case where the actual IP address is not obtained by the fraud detection applet 312. This could happen for a number of reasons. In one case, the client device 102 may be missing the applet execution framework, and would therefore be unable to execute the applet 312. In another case, the user may actuate the login button 306 to begin step 7 before steps 3 through 6 have been completed. In such an embodiment, a tradeoff between the robustness of the fraud detection and the experience for the user occurs. However, the impact on the ability of the system 200 to detect fraud can be mitigated by not allowing the login button 306 to be actuated until steps 3 through 6 are completed, or by treating any login request that does not include the true IP address as being more likely to be fraudulent than a login request that does contain that information.

In another embodiment, the gathering and transmission of fraud detection data to the fraud data gathering server 206 can occur without user interaction. In such an embodiment, the web page 300 can be something other than a login web page, and the fraud data gather script 310 and the fraud detection applet 312 can be implemented to gather the fraud detection data, including the true IP address of the client device, and transmit the data to the web server 204 or to the fraud data gathering server 206 without any user interaction such as submission of a web form.

In one embodiment, there is no direct communication between the IDES server 202 and the web server 204 or the fraud data gathering server 206. This obviates the need for synchronizing communication between these servers, and allows greater flexibility in deploying the system 200 across various network topologies and established network services. These characteristics allow the system 200 to have increased performance, and to thereby improve the experience for the users. Another advantage of this embodiment is that the IDES server 202 can be deployed without installing additional executable software on the web server 204. This, along with the lack of a communication channel between the IDES server 202 and the web server 204, can help to ease deployment and maintenance of the system 200.

While the above description mainly discusses embodiments using a web browser and a web server, in other embodiments, other technologies and computer network topologies may be used. For example, in one embodiment, a generic web browser executing on a personal computer may be replaced by an application executing on a mobile device such as a smart phone, tablet computer, and the like. In this case, the fraud detection applet 312 can be downloaded as described above, or can alternatively be integrated into the application executing on the mobile device. In this embodiment, the fraud detection applet 312 executing within the application would contact the IDES server 202 over a port not normally used for basic application communication in order to avoid detection and manipulation, and to obtain the actual network address of the mobile device.

In the present application, conditional language such as, among others, "can," "could," "might," or "may," unless specifically stated otherwise or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements, and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While illustrative embodiments have been illustrated and described, it will be appreciated that various changes can be made therein without departing from the spirit and scope of the invention.

The invention claimed is:

1. A non-transitory computer-readable medium having computer-executable instructions stored thereon that, in response to execution by one or more processors of a computing device, cause the computing device to perform actions for gathering fraud detection data, the actions comprising:
communicating, by a computing device, with an identification server as a result of executing fraud data gathering code on the computing device, wherein the identification server obtains at least one identifying characteristic from the computing device, wherein the computing device communicates with the identification server via a port different from ports used by the computing device to communicate with a proxy server for web page transmissions;
receiving, by the computing device, the at least one identifying characteristic from the identification server; and
transmitting, by the computing device, the at least one identifying characteristic to a content server.

2. The computer-readable medium of claim 1, wherein the at least one identifying characteristic information determined by the identification server includes network address information that identifies the computing device in a network.

3. The computer-readable medium of claim 2, wherein the network address information that identifies the computing device includes an IP address assigned to the computing device.

4. The computer-readable medium of claim 3, wherein the IP address assigned to the computing device is an actual IP address of the computing device.

5. The computer-readable medium of claim 1, wherein the actions for gathering fraud detection data further include encrypting the at least one identifying characteristic of the computing device before transmitting the at least one identifying characteristic to the content server.

6. The computer-readable medium of claim 1, wherein the identification server is an identification echo service server and the content server is a web server.

7. The computer-readable medium of claim 6, wherein transmitting the at least one identifying characteristic to the web server includes transmitting the at least one identifying characteristic to the web server along with login information in a web form.

8. The computer-readable medium of claim 1, wherein the actions for gathering fraud detection data further include:
transmitting, by the computing device, an echo request to the identification server; and
receiving, by the computing device, a response from the identification server including an actual IP address of the computing device.

9. A system comprising:
first computer hardware, the first computer hardware configured to:
transmit content to a client device, the content containing an instruction to the client device to execute fraud detection code; and
second computer hardware, the second computer hardware configured to:
communicate with the client device to detect an identifying characteristic of the client device using a port different from ports used by the client device to communicate with a proxy server for web page transmissions; and
transmit the detected identifying characteristic to the client device for subsequent transmission to the first computer hardware;
wherein the fraud detection code causes the client device to communicate with the second computer hardware; and
wherein the first computer hardware is further configured to receive the detected identifying characteristic from the client device.

10. The system of claim 9, wherein the client device is configured to communicate with the first computer hardware through the proxy server.

11. The system of claim 9, wherein the second computer hardware is further configured to:
detect an Internet Protocol (IP) address of the client device, wherein the detected IP address is different from an IP address of the proxy server associated with the client device; and
transmit the detected IP address of the client device to the client device as the detected identifying characteristic.

12. The system of claim 11, wherein the second computer hardware is further configured to:
generate a hash value based on the detected IP address of the client device; and
transmit the detected IP address of the client device and the hash value to the client device.

13. The system of claim 12, wherein the first computer hardware is further configured to validate the detected IP address received from the client device based on the hash value received from the client device.

14. The system of claim 9, wherein the second computer hardware is further configured to:
generate a TCP/IP stack fingerprint of the client device; and
transmit the TCP/IP stack fingerprint to the client device as the detected identifying characteristic.

15. The system of claim 9, wherein the first computer hardware is further configured to transmit the detected identifying characteristic received from the connected client device to a fraud data gathering server for further processing.

16. A server, comprising:
a hardware processor; and
memory having computer-executable instructions stored thereon that, in response to execution by the hardware processor, cause the server to perform actions including:
receiving a request from a client device via a port different from ports used by the client device to communicate with a proxy server for web page transmissions, wherein the client device establishes a connection with the server as a result of executing fraud data gathering code; and
determining identification information of the client device from the connection with the client device; and
transmitting the identification information to the client device.

17. The server of claim 16, wherein the request from the client device is an echo request.

18. The server of claim 17, wherein transmitting the identification information further comprises transmitting an echo response to the client device.

19. The server of claim 18, wherein the echo response contains flags indicating a type of content.

20. The server of claim 16, wherein determining identification information further comprises:
   examining addressing information associated with the connection between the server and the client device; and
   extracting from the addressing information the actual IP address of the client device.

21. The server of claim 16, wherein the fraud detection code is part of an application configured to be executed by the computing device.

22. The server of claim 16, wherein the identification information is the actual IP address of the client device.

* * * * *